(12) United States Patent
Newhouse et al.

(10) Patent No.: US 6,769,421 B2
(45) Date of Patent: Aug. 3, 2004

(54) METHOD AND APPARATUS FOR VAPORIZING FUEL

(75) Inventors: Leslie A. Newhouse, Mount Horeb, WI (US); Randolph M. Pentel, 815 Deer Trail Ct., Mendota Heights, MN (US) 55118

(73) Assignee: Randolph M. Pentel, Mendota Heights, MN (US)

( * ) Notice: Subject to any disclaimer, the term of this patent is extended or adjusted under 35 U.S.C. 154(b) by 0 days.

(21) Appl. No.: 10/345,717

(22) Filed: Jan. 16, 2003

(65) Prior Publication Data

US 2003/0140904 A1 Jul. 31, 2003

Related U.S. Application Data

(63) Continuation-in-part of application No. 09/674,863, filed as application No. PCT/US00/22999 on Aug. 22, 2000, now abandoned.
(60) Provisional application No. 60/150,421, filed on Aug. 24, 1999.

(51) Int. Cl.$^7$ .............................................. F02M 31/00
(52) U.S. Cl. ...................................... 123/557; 123/549
(58) Field of Search ................................. 123/543–557

(56) References Cited

U.S. PATENT DOCUMENTS

| | | | | |
|---|---|---|---|---|
| 3,931,800 A | * | 1/1976 | Gendron ...................... 123/549 |
| 4,018,199 A | * | 4/1977 | Furucz ......................... 123/547 |
| 4,064,852 A | * | 12/1977 | Fulenwider, Jr. ........... 123/25 B |
| 4,106,457 A | * | 8/1978 | Totten et al. ................ 123/557 |
| 4,157,700 A | * | 6/1979 | Conner ......................... 123/557 |
| 4,423,716 A | * | 1/1984 | Glass ........................... 123/557 |
| 4,512,323 A | * | 4/1985 | Ruth et al. ................... 123/557 |
| 4,648,372 A | * | 3/1987 | Michaud et al. ............. 123/557 |
| 4,700,047 A | * | 10/1987 | Crossett et al. .............. 219/205 |
| 5,291,870 A | * | 3/1994 | Covey, Jr. .................... 123/545 |
| 5,398,663 A | * | 3/1995 | Kulasinghe .................. 123/549 |
| 6,189,518 B1 | * | 2/2001 | Cooke .......................... 123/549 |
| 6,237,576 B1 | * | 5/2001 | Buccino et al. .............. 123/549 |

* cited by examiner

*Primary Examiner*—Marguerite McMahon
(74) *Attorney, Agent, or Firm*—Nikolai & Mersereau, P.A.

(57) ABSTRACT

A method and apparatus is provided for the vaporization of liquid hydrocarbon fuel in a closed system prior to its entry into an internal combustion engine's combustion chambers in amounts proportional to the acceleration level of the engine. The apparatus is a fuel vaporizer interposed between an engine's fuel injection system and combustion chambers and forms a canister housing. Liquid fuel enters via an inlet in the housing, is vaporized by heating it to boiling and is drawn out of the canister via an outlet under a partial vacuum to the combustion chambers of the engine. The system is closed except for a vacuum connection with the engine's combustion chambers. Heating means are provided to heat the fuel to boiling without heating it to its flash point, thus avoiding its pre-ignition.

5 Claims, 5 Drawing Sheets

METHOD AND APPARATUS FOR VAPORIZING FUEL

CROSS-REFERENCE TO RELATED APPLICATIONS

This is a continuation-in-part of Ser. No. 09/674,863 filed Nov. 7, 2000 now abandoned which was entitled to the benefit of U.S. Provisional Patent Application Serial No. 60/150,421, filed Aug. 24, 1999 and is a U.S. National filing from International Application PCT/US00/22999 filed Aug. 8, 2000. Applicant requests that Disclosure Document no. 458891, filed at U.S. Patent and Trademark Office on Jul. 10, 1999, be associated with this application.

TECHNICAL FIELD

The present invention is directed to fuel vaporizer devices for vaporizing liquid fuel supplied to an internal combustion engine, and more specifically to a method and apparatus for efficiently vaporizing liquid hydrocarbon fuel in a closed system prior to its entry into an internal combustion engine's combustion chambers in amounts proportional to the acceleration level of the engine, thereby increasing the engine's fuel efficiency and decreasing the engine's emissions of pollutants to the environment.

BACKGROUND ART

In an internal combustion engine, combustion of a fuel takes place in a confined space, producing expanding gases that are used directly to provide mechanical power. In the confined space, or combustion chamber, a portion of the liquid hydrocarbon fuel is converted to a gas because of the partial vacuum formed therein during the intake portion of the engine's cycle of operation. During the following compression portion of the engine's cycle, the compression of the gases (in diesel engines) and/or the heat of a spark (as in gasoline engines) functions to ignite the gaseous portion of the fuel. The resulting expansion of gases during the power portion of an engine's cycle forces movement of a piston and resulting conversion of chemical to mechanical energy.

The fuel must be in a gaseous state to combust. This is true whether the fuel is gasoline, diesel, liquid petroleum, wax, wood or any other combustible material. This is why the liquid fuel used in an internal combustion engine is first converted to its gaseous state before being combusted under the pressure of compression and/or by the heat of a spark.

Unfortunately, the internal combustion engine currently accomplishes this task inefficiently by the partial vacuum created in the combustion chamber (or cylinder) during the intake portion of an engine's cycle. In that partial vacuum, liquid fuel and air is drawn into the cylinder where a portion of the liquid fuel is vaporized because of the vacuum and thus combustible when exposed to the heat of a spark or under compression. Unfortunately, less than 40% of the liquid fuel is typically vaporized in this process and combusted to provide power and heat. Most of the remaining liquid fuel is converted to vapor after the initial combustion, too late to be converted to mechanical power and heat, and is instead released to the environment during the exhaust phase of the cycle as a pollutant. Some 60% or more of the liquid fuel entering the combustion chamber is, therefore, wasted and exhausted to the environment.

Numerous attempts have been made in the prior art to more completely vaporize the liquid fuel supplied to internal combustion engines in order to improve their performance and/or efficiency, or to reduce the pollutants discharged into the atmosphere with the exhaust from the engine. The higher the proportion of fuel entering an engine's cylinder as vapor rather than liquid, the higher the proportion of fuel combusted and the less fuel required to achieve the same amount of mechanical energy. Given the ever increasing costs of fossil fuels and the unreliability of foreign sources, it is understandable that much effort would be expended to increase energy efficiency to conserve energy as well as decrease pollution.

Several U.S. patents were found that attempt to increase the proportion of fuel entering the combustion chambers as a gas to improve an engine's efficiency and limit the amount of fuel emitted as pollutants. They each fail to achieve this goal adequately, however, for reasons noted below.

U.S. Pat. No. 4,350,134, to Sparks, relates to a method and apparatus for producing an air/fuel vapor mixture for use in the combustion chambers of an internal combustion engine. The apparatus includes an enclosure into which ambient air is introduced with a heater for heating the ambient air together with a fuel vaporizer for vaporizing fuel injected into the enclosure and for mixing with the heated air and another heater for heating the resulting air/fuel vapor mixture which is subsequently conducted out of the enclosure to the combustion chambers of the internal combustion engine. The invention fails to provide means by which the amount of fuel entering the vaporization device is regulated to match the engine's precise requirements at any given time.

U.S. Pat. No. 4,538,583, to Earl, and its Continuation-in-Part U.S. Pat. No. 4,622,944, relate to a system for supplying fuel to an internal combustion engine that includes a two-stage evaporator serially mounted within the fuel supply system of the engine. This device provides no precise fuel control and may produce more fuel vapor than needed at low speeds and not enough at higher speeds. The device provides no idle control and no way to move the vehicle until the device heats the fuel to its vapor point. The device also may be hazardous in that it contains glow plugs that could potentially heat some of the fuel to its flash point and cause a fire.

U.S. Pat. No. 4,550,706, to Hoffman, relates to a fuel vaporizer comprising an air/fuel heating and mixing chamber which vaporizes liquid hydrocarbon fuel to a heated, dry vaporous state and mixes it with heated air for introduction of the mixture into a primary or main air stream for supply to the cylinders of the engine. This device contains design flaws, one involving the location of a float relative to nozzles that will result in little to no fuel flow in the device, and another that will result in a buildup of fuel at the device's atomizer. Such a buildup of fuel could pose an explosion hazard if the vehicle is involved in an accident.

U.S. Pat. Nos. 4,665,879 and 4,622,944, to Earl, relates to a fuel evaporation apparatus which comprises a two-stage evaporator designed to receive fuel such as gasoline in a liquid form and to completely transform the liquid fuel into its vapor state so as to increase the efficiency of operation of the associated internal combustion engine. The main flaw in this device is its lack of a fuel flow control so that fuel flow can be regulated to match the vehicle's speed. The device also could result in a buildup of fuel that would pose a danger of explosion in an accident.

U.S. Pat. No. 4,898,142, to Van Wechem, et al., relates to a combustion engine with fuel injection system, having at least one cylinder with an air inlet passage, into which passage opens a fuel spray valve which is connected to a fuel pipe with pump, the fuel pipe containing a heating element.

The heating element of the device, however, does not heat the fuel sufficiently for vaporization.

U.S. Pat. No. 5,398,663, to Kulasinghe and Estate, relates to an internal combustion engine comprising a heated chamber with heating element in which liquid fuel is gasified. This device fails to incorporate a means by which fuel flow can be regulated to match the requirements of the engine at variable speeds.

U.S. Pat. No. 5,746,188, to Cooke, relates to an apparatus for heating and vaporizing a liquid hydrocarbon fuel supplied to an internal combustion engine that includes a housing having an inlet and outlet. The heating wire of this device will not provide enough heat to vaporize the fuel and will potentially short out. The fuel vapor that is formed in this device is not transported to the engine quickly enough to be responsive to changes in acceleration.

U.S. Pat. No. 5,778,860, to Garcia, relates to a system for partially vaporizing the fuel to a vehicle internal combustion engine comprising a set of fittings for passing the fuel from the fuel pump or injection pump through a vaporization chamber which is placed adjacent the engine to heat the fuel, partially vaporizing it. This device's heat source will not heat the fuel adequately to vaporize it.

The present invention is directed to overcoming one or more of the problems as set forth above.

DISCLOSURE OF INVENTION

Brief Summary of the Invention

The fuel vaporizer of the present invention is interposed between an internal combustion engine's fuel injection system and intake manifold. It functions to vaporize a substantial portion of the liquid fuel injected into it by the fuel injector, thereby dramatically increasing the proportion of fuel supplied to the combustion chambers of the engine as a gas rather than liquid. Since it is only in its gaseous form that the fuel is combusted, increasing the proportion of fuel in the combustion chamber as gas greatly increases the proportion combusted during the compression portion of an engine's cycle. The invention thus achieves a substantial improvement in fuel economy with a coincident reduction in pollutants through nearly complete combustion of the fuel. The invention will thus achieve enormous energy savings with fuel-injected engines of all kinds (both old and new) by an elegantly simple, safe and efficient means.

Objects and Advantages

Accordingly, a method and apparatus for vaporizing fuel prior to its entry into the cylinders of a fuel-injected internal combustion engine is provided. Several objects and advantages of the present invention are to provide:

a) means by which fuel may be more efficiently combusted and converted to mechanical energy in an internal combustion engine, thereby significantly increasing a vehicle's fuel efficiency and decreasing a vehicle's emission of pollutants to the environment;

b) heating means by which fuel may be largely converted to its gaseous state prior to entry into an engine's combustion chambers by first heating the fuel to its boiling point using heating means powered by the vehicle's electrical power source;

c) means by which the vaporization of fuel is achieved safely without risk of fire by heating the fuel to boiling, but not to its flash point;

d) means by which the vaporization of fuel is achieved in a closed system, thereby preventing the emission of excess fuel vapor to the environment and providing for its storage for later use at engine startup;

e) means by which the amount of fuel being vaporized at any one moment is regulated and may be varied to meet the precise power output needs of the vehicle by use of the engine's fuel injection system;

f) means by which engine start is assured in both warm and cold climates; and, g) means by which the present invention may be easily adapted and tooled to fit most engines, including both old and new engines.

Further objects and advantages of the present invention will become apparent from a consideration of the drawings and ensuing description.

BRIEF DESCRIPTION OF DRAWINGS

For a better understanding of the present invention, reference may be made to the accompanying drawings, in which.

DESCRIPTION OF THE INVENTION

Figure 1:
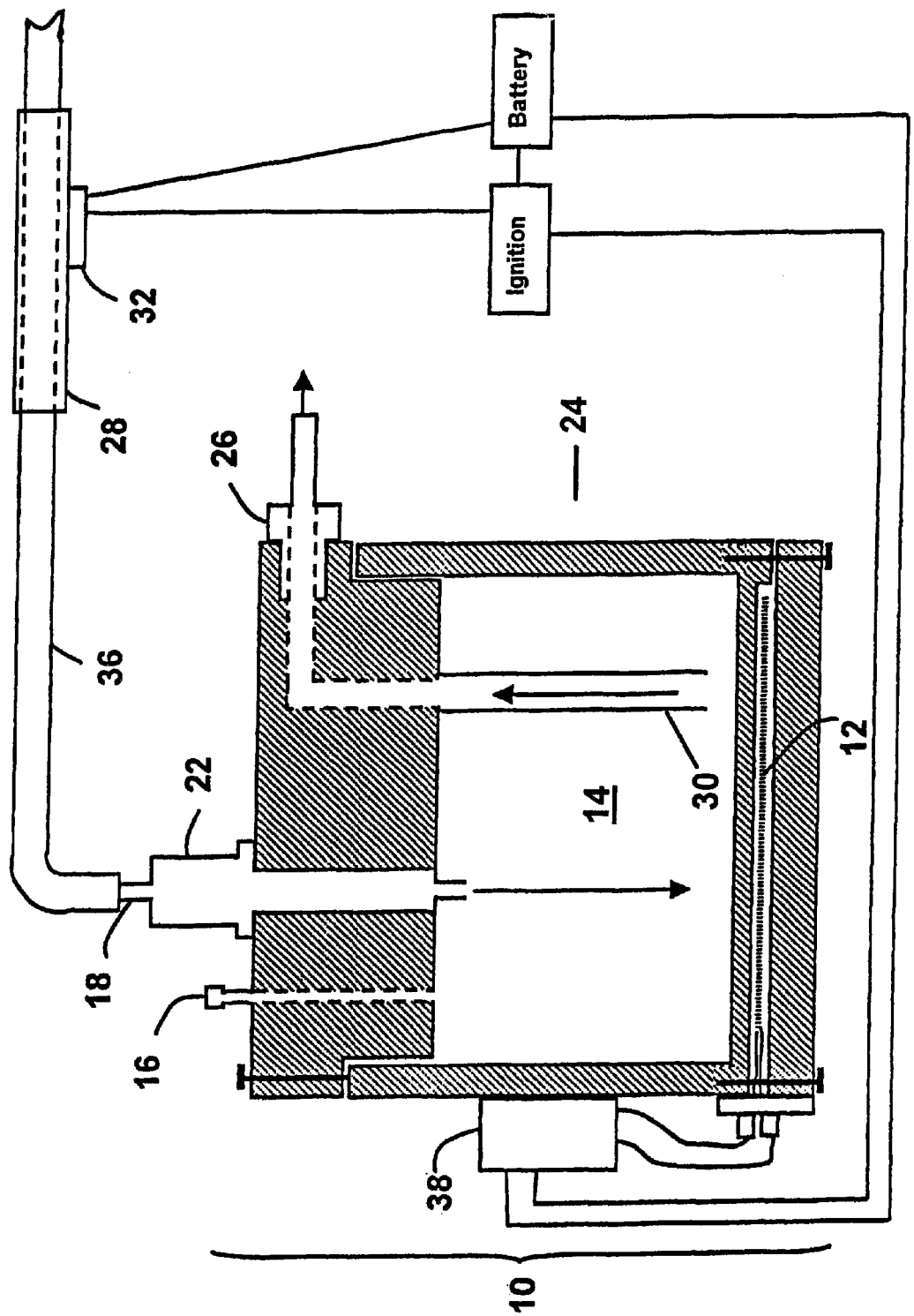
FIG. 1 is a cross-sectional schematic view of an embodiment of the present invention showing its internal components.

Referring now specifically to the figures, in which identical or similar parts are designated by the same reference numerals throughout, the first referring to FIG. 1, the components of the apparatus of one embodiment of the present invention are depicted and described. It should be understood that the following detailed descriptions relate to various of the currently known embodiments of the present invention. However, the present invention can assume numerous other embodiments, as will become apparent to those skilled in the art.

Embodiments—Apparatus

Referring to FIG. 1, the basic components of one embodiment of the present invention, a fuel vaporizer 10, are depicted. FIG. 1 is a cross-sectional view of a fuel vaporizer 10 in its more generic configuration for purposes of depicting its internal components. In this embodiment, the fuel vaporizer 10 is adapted for use in a fuel-injected internal combustion engine and is interposed between the engine's fuel injection system and intake manifold.

A fuel line connection 18 connects a fuel injector 22 to the engine's fuel line 36. Liquid fuel enters the fuel vaporizer 10's internal vaporization chamber 14, via the fuel injector 22. The fuel injector 22 contains a fuel injector control 20 (see FIG. 2) to control the amount of liquid fuel entering the fuel vaporizer 10.

In this embodiment, the liquid fuel is pre-heated before it reaches the fuel vaporizer 10 by means of a fuel line heater 28 inserted at a point in the fuel line prior to its connection to the fuel vaporizer 10. Other embodiments are possible that do not require pre-heating of the fuel prior to entry into the fuel vaporizer 10. The fuel line heater 28 is controlled by a thermostatic temperature control 32 powered by the vehicle's battery and activated upon ignition. The fuel line heater 28 may comprise any of several commonly available alternative types of fuel line heaters. They may simply comprise a metal tube that warms the fuel as it passes through en route to the fuel vaporizer 10, or be of more elaborate design.

The main body of the fuel vaporizer 10 consists of a heating and vaporization canister housing 24, made of aluminum, or other material having a high thermal conductivity and able to disperse heat evenly, and defining an internal vaporization chamber 14. The surfaces of the internal chamber 14 may be smooth, as depicted in FIG. 1, or may contain protrusions into the interior of the chamber 14 to increase the surface area for heating the fuel. For example, the interior surface of the chamber 14 may form fin-like or other sorts of protrusions into the interior.

The heating and vaporization canister housing 24 may be formed of a solid cup-shaped portion fitted securely with a cap portion as depicted in FIG. 1. However, many configurations and shapes are possible, including the single piece design depicted in FIGS. 2 and 3.

In this particular embodiment, the cap portion of the canister housing 24 is fitted securely to the cup portion by means of screws and sealants, or other similar means, to ensure an airtight seal that will resist the pressure of the vaporizing fuel within. The housing 24 defines an inlet, an outlet and an air intake hole. In this particular embodiment the inlet, outlet and air intake hole are defined in the cap portion of the housing 24. The air intake hole is fitted with a one-way air intake valve 16, the inlet is fitted with the fuel injector 22, and a connector 26 is fitted to the outlet, forming a vacuum connection ultimately with the engine's combustion chambers. In this particular embodiment, the fuel vapor enters the intake manifold 34 en route to the engine's combustion chambers.

In this particular embodiment, the vaporized fuel-air mixture is siphoned from the vaporization chamber 14 through a siphon tube 30 which extends down into the vaporization chamber 14 communicating the chamber 14 with the connector 26. The fuel-air mixture is siphoned away from the fuel vaporizer 10 through a hose attached to the connector 26 to the engine's combustion chambers. In this embodiment, the fuel vapor first enters the intake manifold 34 en route to the combustion chambers of the engine's cylinders. Air moves into the chamber 14 through the air intake valve 16 to allow the siphoning of gases and liquid therefrom under the partial vacuum. Thus, the fuel vaporizer 10 is a completely self-contained unit in which liquid fuel is injected into the vaporization chamber 14 where the fuel is heated and vaporized and subsequently siphoned to the engine's combustion chambers with no leakage to the outside environment.

Figure 2:
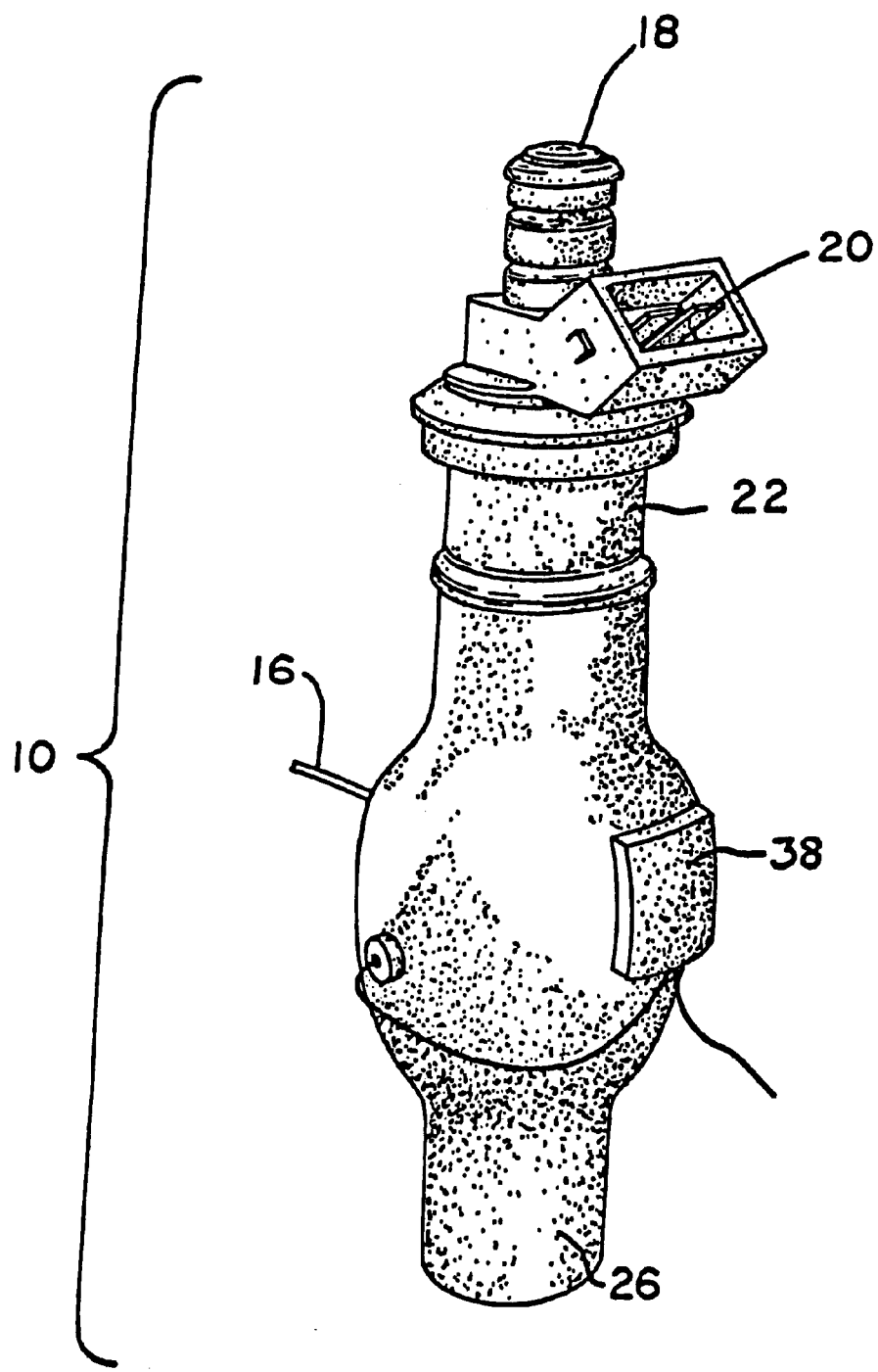
FIG. 2 is a frontal view of an embodiment of the present invention as it may be designed to fit an intake manifold.
Figure 3:
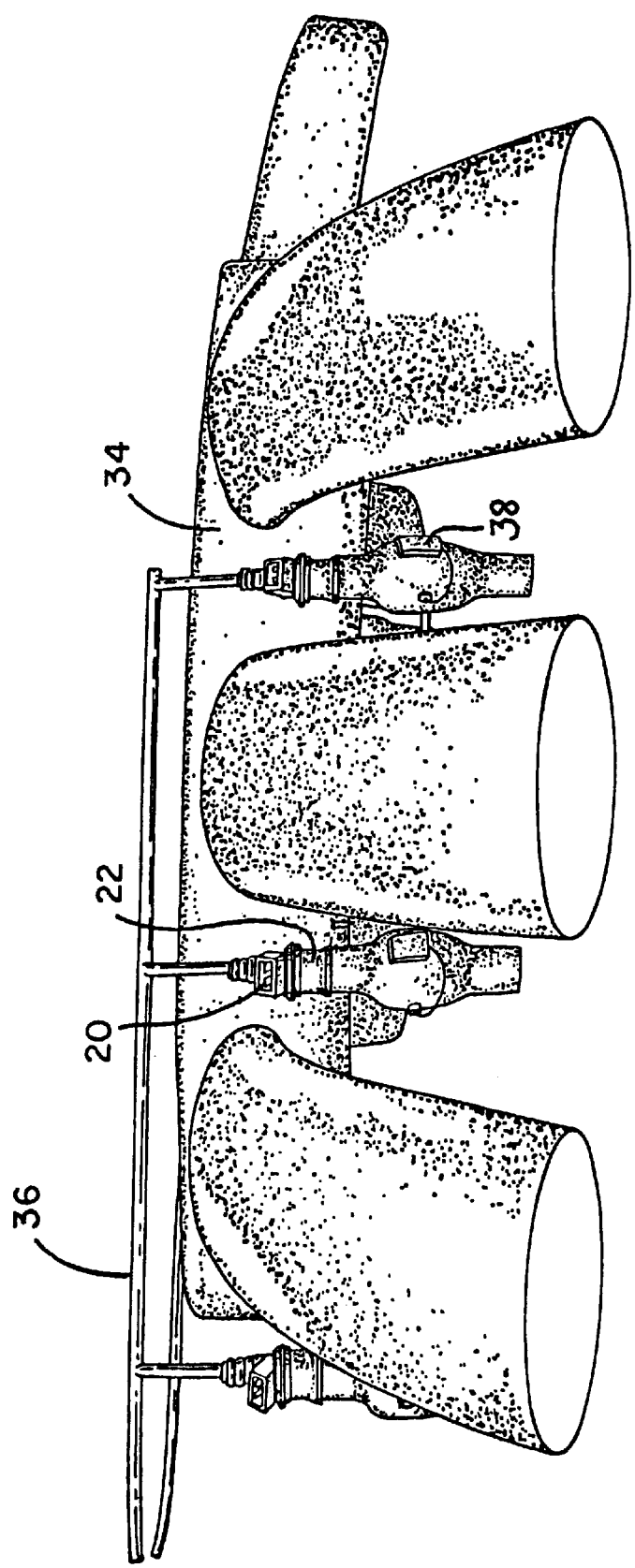
FIG. 3 is a side view of a six-cylinder intake manifold showing orientation of fuel vaporizers thereto.

The siphon 30 is not required when the fuel vaporizer 10 is made in a straight-through design as depicted in FIGS. 2 and 3. When the housing 24's inlet is at the top of the vaporizer 10 and the outlet is at the bottom, the danger of unvaporized fuel build-up is minimized, thus removing the need for a siphon. Instead, any fuel vapor and unvaporized fuel will simply pass through the vaporizer 10 to the engine's combustion chambers.

The fuel vaporizer 10 further consists of a heating means by which the liquid fuel entering the canister housing 24 is heated to boiling and vaporized. In this particular embodiment, the heating means comprises a resistance heating element 12 whose temperature is controlled to a particular temperature setting optimal for a given fuel by its own internal temperature sensor and an externally-mounted thermostatic electronic control means 38. The heating element 12 may assume various sizes and shapes according to the design and shape of the fuel vaporizer 10. Also, there may be multiple heating elements 12 to optimally heat the interior surfaces of the chamber 14. The heating elements may be on the inside or the outside of the housing 24. In addition, alternative heating means may be used to heat the fuel to boiling according to the most appropriate technologies available. These alternatives may include, for example, the use of microwave radiation to heat the liquid fuel in the interior of the vaporization chamber 14, and temperature sensors mounted internally to monitor the fuel temperature.

However, in the embodiment depicted in FIG. 1, the electronic control means 38 is connected electrically to the vehicle's ignition so that the resistance heating element 12 is not activated until the vehicle is turned on with the ignition key. The electronic control means 38 is also connected to and powered by the vehicle's battery.

As here depicted, the resistance heating element 12 is fitted into a groove cut in the bottom outer surface of the canister 24's cup portion. In this way the resistance heating element 12 is positioned nearer the inner surface of the canister 24. The resistance heating element 12 is held in place by a bottom to the canister 24 that is secured to the cup portion, effectively sandwiching the resistance heating element 12 between it and the canister's cup portion, thereby safely holding the resistance heating element 12 in place and unexposed.

Though as mentioned above, there may be more than one heating element 12 and these may be of varying sizes and shapes, oriented to the canister housing 24 in ways to optimize heat transfer to the interior surfaces of the vaporization chamber 14. Likewise, the surface of the interior chamber 14 may be smooth or form fin-like or other shapes protruding inwardly so as to increase the surface area of the chamber 14's heated interior at which the liquid fuel may be heated to vaporization.

The heating and vaporization canister housing 24 is constructed of aluminum because of its ability to transfer heat evenly across its surfaces, thus avoiding the danger posed by hot spots that may otherwise develop. Vaporized fuel may be heated to its flash point and fuel pre-ignition may occur at such hot spots, both of which should be avoided for safe operation of the present invention. Other materials similarly able to disperse heat evenly may also be used.

FIGS. 2 and 3 show the fuel vaporizers 10 as they would generally be oriented relative to the intake manifold 34 of a vehicle containing a six-cylinder engine. Three of the fuel vaporizers 10 are shown in FIG. 3 as they would be connected to the vehicle's fuel line 36 and relative to the manifold 34. A spacer may be utilized between the intake manifold 34 and the fuel vaporizer 10 to mount the fuel vaporizer on, particularly when retrofitting an engine which was not designed to have the fuel vaporizer attached. Connections from each fuel vaporizer 10 not illustrated in FIG. 3 are the fuel injector control 20's connection to the engine's computer, the electronic control means' 38 connection to the vehicle's 12V battery, and the connector 26's connection to the intake manifold 34 of the engine. As designed to individually serve each cylinder, the fuel vaporizer 10's air intake valve 16, fuel injector 18 and connector 26 are oriented differently than depicted in FIG. 1, in order to more efficiently fit to the intake port for each cylinder. In particular, they are depicted in a straight-through design with the inlet fitted with the fuel injector 22 at the top and the outlet fitted with the connector 26 to the intake manifold 34 at the bottom.

Figure 4:
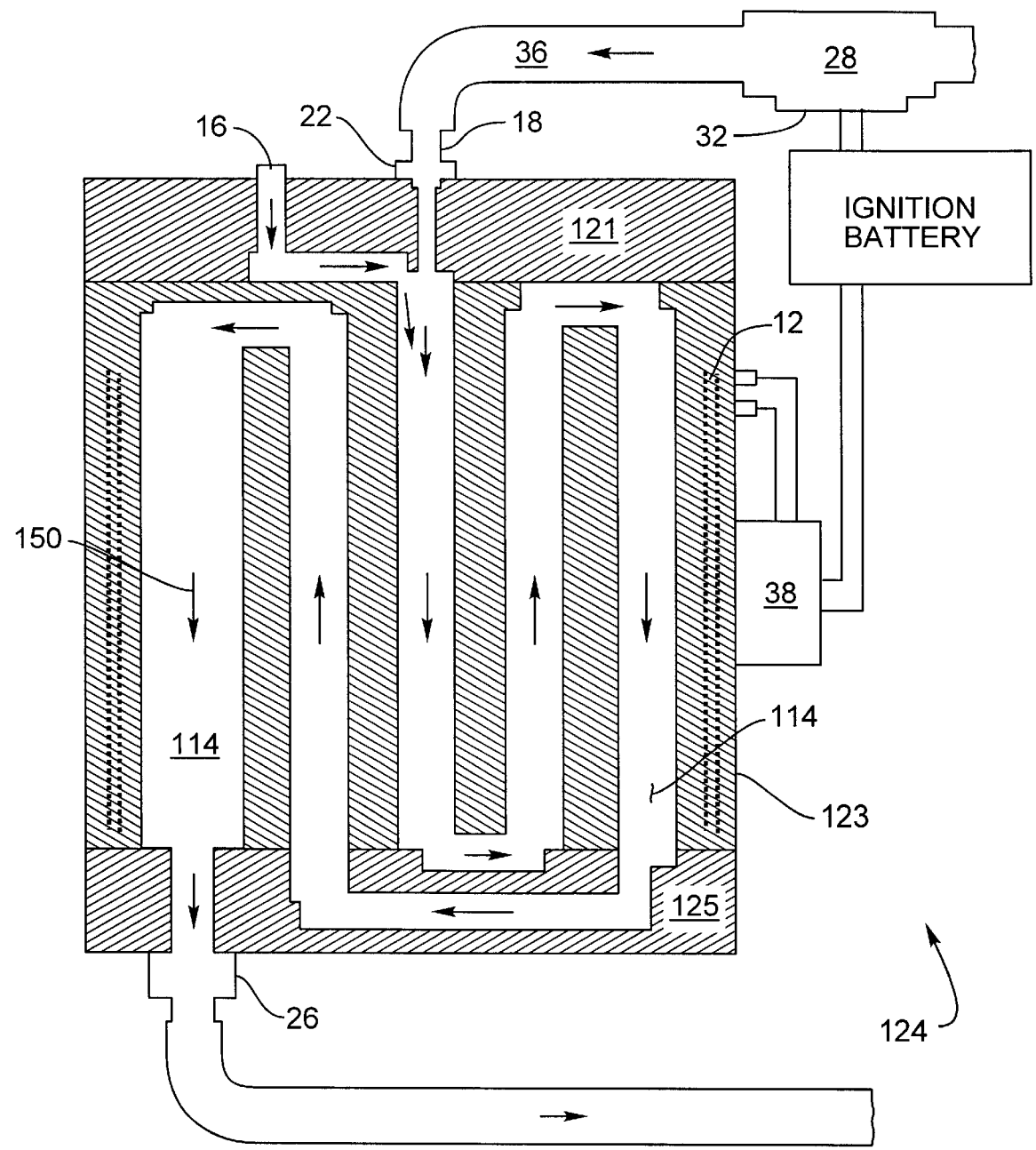
FIG. 4 is a cross sectional view of the vaporization canister.
Figure 5:
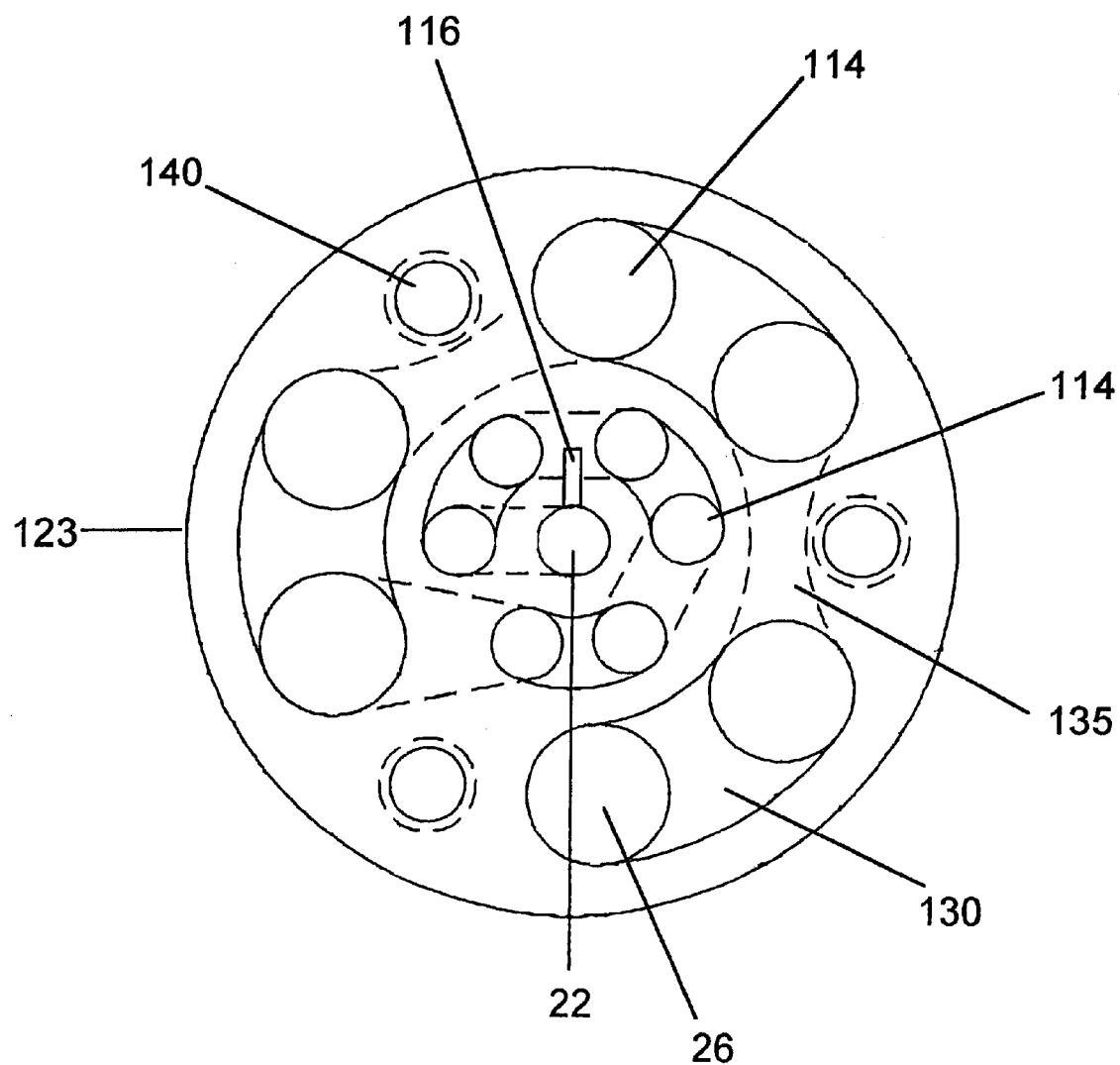
FIG. 5 is a top view of the cylinder.

In an alternative embodiment shown in FIGS. 4 and 5 the fuel vaporizer 10 is a heated cylinder 123 having at least one channel for the fuel air mixture to travel in while it is heated to vaporize the fuel. It is preferred to have multiple channels with the fuel being redirected into a new channel with the help of end caps 121, 125 at the top and bottom of the cylinder 123.

In FIG. 4 the fuel from fuel line 36 enters the fuel injector 22 for injecting fuel into the central channel 114 of the cylinder 123. The fuel may be preheated by fuel line heater 28 if needed. An air intake 16 and air intake channel 116 allows air to enter the central channel 114 along with the fuel. This allows the vacuum of the engine to pull the fuel air mixture to the engine. Heaters such as electric heaters 12 inside of the cylinder 123 walls can be used to heat the cylinder 123 such that the fuel in the channels is heated. Heaters 12 may alternatively be on the exterior of the cylinders 123. The longer the path length of the channels the more the fuel will be heated because of its longer time in the channels 114 of the cylinder 123. The fuel then exits the vaporizer 124 at the intake manifold connector 26 and travels to the manifold for use in an engine.

The top of the cylinder 123 is shown in FIG. 5, it has a plurality of channels 114. The inner ring of channels is smaller than the outer ring of channels in this embodiment for carrying the heated and therefore expanded gasses, as it gets closer to exiting the cylinder. The cylinders 114 may each be of a different diameter or of changing diameters to allow for the expansion of the gas flowing therein. At the top and bottom ends of the cylinder 123 the gas is turned by end caps 121, 125 and directed to the next adjacent channel in the path. The top connection portion 130 shown by solid lines, connects the channels 114 and at the bottom the connection portion 135, shown by dashed lines, connects the channels 114. The top and bottom end caps 121 and 125 respectively have compatible connection portions 130, 135 to guide the fuel air mixtures between the channels. Bolt holes 140 allow the end caps 121, 125 to be attached to the cylinders.

Embodiments—Method of Operation

Referring to FIG. 1, the basic components of the present invention, a fuel vaporizer 10, are depicted. FIG. 1 is a cross-sectional view of a fuel vaporizer 10 in its more generic configuration for purposes of depicting its internal components. In this embodiment, the fuel vaporizer 10 is adapted for use in a fuel-injected internal combustion engine and is interposed between the engine's fuel injection system and combustion chambers.

The fuel vaporizer 10 functions to substantially vaporize the liquid fuel that would otherwise be injected by the fuel injection system directly into the engine's intake manifold. By vaporizing a high percentage of the liquid fuel before it enters a vehicle's cylinders, the fuel vaporizer 10 increases the efficiency with which an internal combustion engine converts chemical to mechanical energy. The higher the proportion of fuel entering the engine's combustion chambers as gas vapor, the higher the percentage of fuel combustible during the compression portion of the engine's cycle and the lower the percentage of fuel exhausted as waste.

Referring to FIG. 1, the basic components of the present invention are depicted in a cross-sectional view in order to illustrate their operation. The liquid fuel travels through the fuel line 36 where it is heated at the fuel line heater 28 prior to entering the fuel vaporizer 10. The fuel line heater 28 pre-heats the liquid fuel so that it is at a fairly high temperature (e.g., approx. 74–79 degrees C. for gasoline fuel) as it enters the fuel vaporizer 10, thus increasing the efficiency with which it may be heated further to vaporization within the vaporization chamber 14. The pre-heating, though not essential to the operation of the fuel vaporizer 10, functions to assure efficient operation of the fuel vaporizer 10 in variable external temperature conditions, particularly in cold conditions.

The pre-heated liquid fuel is injected into the internal vaporization chamber 14 of the heating and vaporization canister housing 24 by the engine's fuel injector 22 in amounts precisely controlled by the fuel injector control 20 (see FIG. 2) which is connected to and controlled by the vehicle's computer. The fuel injector control 20 varies the amount of fuel injected to meet the demands of an engine operating over a broad range of conditions in accordance with such factors as engine rpm, throttle position and rate of opening/closing, barometric pressure or manifold absolute pressure, air temperature, water and/or oil temperature, fuel pressure, mass airflow and exhaust gas oxygen. Some small portion of the liquid fuel is typically vaporized as it passes through the fuel injector 22, but the majority remains liquid. Though fuel injection systems have greatly increased the fuel efficiency of engines, there still is only a small portion of fuel (around 40%) actually combusted in an engine's cylinder. The present invention builds on the increased efficiency of fuel-injection systems, by functioning to increase substantially the portion of fuel combusted.

As shown in FIG. 1 once injected into the vaporization chamber 14, the liquid fuel is heated to boiling and vaporized by contact with the internal surfaces of the chamber 14 that have been warmed by a heating means. In this embodiment the heating means comprises a resistance heating element 12, though more than one may be used. The chamber 14 surfaces are heated to a temperature adequate to produce proper vaporization of the fuel upon contact, but still well below the flash point of the fuel vapor.

As shown in FIG. 4 once injected into the vaporization canister housing 124 the fuel travels back and forth in channels 114 to lengthen the path of travel and increase the heat transfer to the fuel to more thoroughly vaporize it.

The temperature of the one or more resistance heating elements 12 is maintained at that temperature both by their own internal temperature sensors and by an externally mounted thermostatic electronic control means 38. The electronic control means 38 is powered by the vehicle's battery and is not activated until the key is turned in the ignition to start the vehicle. In that way, the one or more resistance heating elements 12 are only active when the vehicle is in use. No fuel vapor is ignited until it passes to the combustion chambers of the engine, thus enabling the safe operation of the present invention.

A partial vacuum is created with the downward pull of a piston during the intake portion of the engine's cycle. That partial vacuum causes ambient air to be drawn into the vaporization chamber 14 through the one-way air valve 16, allowing the air-fuel vapor mixture to be drawn out of the canister 24, 124 via the fuel vapor siphon tube 30 (in this embodiment), through the connector 26 and via a hose to the engine's combustion chambers. In this particular embodiment, the fuel vapor first enters the engine's air intake manifold 34 (where more air is added to the mix) en route to the combustion chambers of the cylinders. At the cylinders, the air-fuel vapor mixture is efficiently combusted when exposed to the heat of a spark (or under compression in a diesel engine). The fuel vaporizer 10 is a completely self-contained unit in which liquid fuel enters, is vaporized and moves to the engine's combustion chambers with no leakage to the outside environment.

The air intake valve 16 prevents fuel vapor remaining in the heating and vaporization canister housing 24, 124 at engine shut off from leaking into the atmosphere because it is a one-way valve allowing air to enter the vaporization chamber 14, or channels 114 but not allowing air, or fuel, to leave. Any fuel vapor or liquid fuel left in the heating and vaporization canister housing 24 at shut off will go into the intake port of the engine head through the canister 24's connector 26 via a hose to the engine's combustion chambers. In this particular embodiment, the fuel vapor first enters the intake manifold 34 from which it is drawn into the engine when the engine is restarted.

In addition, in the embodiment of FIG. 1, the opening of the fuel vapor siphon tube 30 is positioned near the bottom of the vaporization chamber 14 in order to prevent the build-up of unvaporized liquid fuel beyond its level should the one or more resistance heating elements 12 fail. In that way, excess liquid fuel and air will simply be drawn up and out of the canister 24 instead of the air-fuel vapor mix, and be combusted in the engine's cylinders in the usual manner. Note that liquid fuel will also pass to the engine's cylinders in the usual manner at initial engine startup during the very brief time it takes after ignition to heat the one or more resistance heating elements 12 fully. The use of a siphon 30 is not necessary in the straight-through design embodiments, such as in FIG. 4, as the fuel entering at the top will simply pass out the bottom of the fuel vaporizer 10 to the engine's combustion chambers without accumulating in the chamber 14.

FIGS. 2 and 3 show the fuel vaporizers 10 as they would be designed to serve each cylinder of an engine individually and oriented relative to an intake manifold 34 of a vehicle containing a six-cylinder engine. They depict the fuel vaporizer 10 in a straight through design with the fuel inlet at the top and the outlet at the bottom.

Further Alternative Embodiments

There are various other possible alternative embodiments of the present invention. For example:

a) the fuel vaporizer 10 may assume various sizes and shapes for customized fit to a variety of engine types and makes. The fuel vaporizer canister 24 and the positioning of the air valve 16, fuel injector 22 and connector 26, may all be varied to meet the particular requirements of an engine's design;

b) the fuel vaporizer 10 may be designed as a part integral to newly manufactured engines or as a part retrofittable to engines already in use;

c) the fuel vaporizer 10 may be adapted for use with gasoline or diesel engines used to power vehicles of a variety of types including cars, trucks or airplanes;

d) the fuel vaporizer 10 may be fitted to individual cylinders or to serve all or only a portion of the cylinders of an engine;

e) the fuel vaporizer 10 may be designed to serve individual cylinders of an engine directly, thus by-passing or replacing the intake manifold 34;

f) the heating means employed to heat the interior surfaces of the chamber 14 may consist of one or more resistance heating elements of various sizes and shapes, or may comprise an alternative technology similarly able to heat the fuel inside the vaporizer 10 to boiling, including such as microwave and other technologies g) the means by which the temperature of the heating means is controlled may likewise vary with the technology employed to heat the interior surfaces of the chamber 14 or the fuel directly; and, h) the material from which the fuel vaporizer 10 is made may be something other than aluminum so long as it is able to likewise disperse heat evenly and avoid the development of hot spots.

Advantages

From the description above, a number of advantages of the present invention become evident:

a) it greatly increases the fuel efficiency of fuel-injected internal combustion engines resulting in cost savings to the user, conservation of a limited resource, and decreased pollution;

b) its ability to increase fuel efficiency by at least 70% in practice (based on early tests of the prototype) and over 100% in theory, will greatly reduce the weight of fuel required by airplanes and other vehicles to travel, thereby addressing one of the main limitations of that industry;

c) its design can be modified while retaining its basic functioning thereby allowing it to be used to retrofit the millions of cars already on the road in addition to improving the new engines manufactured;

d) its flexibility of design allows it to be adapted to engines of variable design and number of cylinders;

e) its closed design prevents fuel from escaping to the environment and from building up under the hood of a vehicle;

f) its incorporation on a fuel injector controlled by the vehicle's computer allows for the amount of fuel vapor produced to match the engine's requirements at any given moment;

g) its construction in a material like aluminum prevents hot spots from developing and the premature ignition of fuel vapor, thus together with its closed design, assuring safe operation;

h) it assures heating of the fuel in such a way as to allow proper functioning no matter what the external temperature; and, i) since the vaporizer can be interposed in a fuel line, a manufacturer of internal combustion engines or a mechanic will be able to accept the use of the present invention fairly easily.

Conclusion, Ramifications and Scope

While the above description contains many specificities, these should not be construed as limitations on the scope of the invention, but rather as an exemplification of one embodiment thereof. It will be readily apparent to those skilled in the art that obvious modifications, derivations and variations can be made to the embodiment without departing from the scope of the invention. For example, a) The present invention can be retrofitted to engines of various makes and cylinder numbers as well as integrated in newly manufactured engines;

b) The resistance heating elements may be composed of a variety of substances and designed and fitted to heat particular surfaces of the vaporizer's internal chamber;

c) The heating and vaporization canister housing may be constructed of a material other than aluminum so long as it shares its heat dissipation properties and will prevent the development of hot spots;

d) The size of the present invention may vary to fit a particular engine's design constraints;

e) The vaporizer may be adapted for use in fuel-injected engines on vehicles of various sorts including cars, trucks, airplanes, and the like; and, f) The present invention can be adapted for use with diesel fuel burning engines.

Accordingly, the scope of the invention should not be determined by the embodiments illustrated.

INDUSTRIAL APPLICABILITY

As is evident from the above descriptions, the present invention can be used to increase the fuel efficiency of fuel-injected engines in a variety of vehicles including cars, trucks, airplanes and the like. This increased fuel efficiency greatly lowers the cost of transportation of both goods and people alike. The advantage to airlines alone would be enormous given the major constraint fuel weight and cost place on that industry's profitability. The overall advantage to our economy of lowering the demand for imported fossil fuels is unquestionable.

In addition to the obvious applicability to industries dependent on the efficient use of fossil fuels, the present invention simultaneously decreases the amount of pollutants released to the environment. This will have enormous consequences, particularly in urban and other areas with concentrated fossil fuel use. Lower pollutant emissions by vehicles will decrease the acidity of rainfall and its resultant negative effects on the erosion of buildings and pollution of soil, among other things. It will also help to ease the negative human health effects of that problem.

The vaporization canister housing 124 of FIG. 4 is shown as a cylinder however any shape housing can be used. Further the channels 114 need not travel the length of the cylinder as shown. The channels may linearly traverse the width of the housing or may spiral through the housing to increase the path length of the fuel air mixture in the housing.

Obviously, many modifications and variations of the present invention are possible in light of the above teachings. It is therefore to be understood that, within the scope of the appended claims, the invention may be practiced otherwise than as specifically described.

What is claimed is:

1. A fuel vaporizer for use in an internal combustion engine, comprising:

housing means constructed of a material having high thermal conductivity and defining an interior chamber, the housing means further defining an inlet connected to a fuel injector at which a fuel is injected into the chamber, an air intake hole comprising a one-way air intake valve, and an outlet through which the fuel exits the chamber;

heating means to heat at least one surface of the interior chamber sufficiently to boil the liquid fuel upon contact with the at least one surface, the heating means comprising at least one resistance heating element mounted exterior to the interior chamber and proximate to the at least one surface of the chamber, and, an electronic control means to control the temperature of the at least one resistance heating element, the electronic control means comprising a thermostatic temperature control connected to the heating means; and, pre-heating means disposed in a fuel line connected to the fuel injector, comprising a fuel line heater with an electronic temperature controller attached thereto and, a fuel vapor siphon tube extending from the outlet inwardly to a point proximate one of the heated surfaces located at the bottom of the interior chamber, to funnel the fuel vapor and any remaining un-vaporized fuel out of the interior chamber to the intake manifold.

2. A fuel vaporizer for use in an internal combustion engine, comprising:

housing means defining an interior chamber, the housing means further defining an inlet connected to a fuel injector at which a fuel is injected into the chamber, an air intake hole comprising a one-way air intake valve, and an outlet through which the fuel exits the chamber; and, heating means to heat the fuel to boiling, comprising microwave radiation.

3. A fuel vaporizer for use in an internal combustion engine, as in claim 2 having, a pre-heating means disposed in a fuel line connected to the fuel injector, comprising a fuel line heater with an electronic temperature controller attached thereto.

4. A fuel vaporizer for use in an internal combustion engine as in claim 2 wherein, the interior chamber has a plurality of channels traversing the length of the interior chamber forming a pathway through the chamber such that the path length is a multiple of the length of the chamber.

5. A fuel vaporizer for use in an internal combustion engine, as in claim 4 having, a pre-heating means disposed in a fuel line connected to the fuel injector, comprising a fuel line heater with an electronic temperature controller attached thereto.

* * * * *